United States Patent [19]
Stoughton

[11] 3,910,262
[45] Oct. 7, 1975

[54] THERAPEUTIC APPARATUS

[76] Inventor: Dan T. Stoughton, 6220 Coldwater Canyon, North Hollywood, Calif. 91606

[22] Filed: Nov. 4, 1974

[21] Appl. No.: 520,237

[52] U.S. Cl. .................................................. 128/40
[51] Int. Cl.² ............................................ A61H 1/00
[58] Field of Search ............................... 128/38–40, 128/50, 53, 79, 278, 299

[56] References Cited
UNITED STATES PATENTS

| | | | |
|---|---|---|---|
| 1,096,092 | 5/1914 | Bisson | 128/53 |
| 1,117,618 | 11/1914 | Ach | 128/38 |
| 1,179,129 | 4/1916 | Maxam | 128/40 |
| 3,421,504 | 1/1969 | Gibbons | 128/79 UX |
| 3,631,853 | 1/1972 | Burdette | 128/79 |

FOREIGN PATENTS OR APPLICATIONS

| | | | |
|---|---|---|---|
| 342,256 | 7/1904 | France | 128/53 |

Primary Examiner—Lawrence W. Trapp
Attorney, Agent, or Firm—Jessup & Beecher

[57] ABSTRACT

Therapeutic apparatus is provided for producing orgasms in males and females. The apparatus includes an electric motor which is coupled to the piston of an hydraulic actuator, the motor serving to drive the piston back and forth in the cylinder thereby to cause the piston cyclically to drive air out of and to draw air into the cylinder, through the cylinder port. One or both of the ports may be coupled to appropriate fittings, one of which is equipped with a massaging sleeve, and the other of which is equipped with a plunger. Each of the fittings is equipped with valves, as will be described, so as to control the action of the sleeve and plunger.

3 Claims, 2 Drawing Figures 3,910,262

THERAPEUTIC APPARATUS

BACKGROUND OF THE INVENTION

Although the apparatus of the invention has general therapeutic utility, it also finds use in medical and clinical facilities. The apparatus also has widespread use in sperm banks, and the like.

DETAILED DESCRIPTION OF THE ILLUSTRATED EMBODIMENTS

Figure 1:
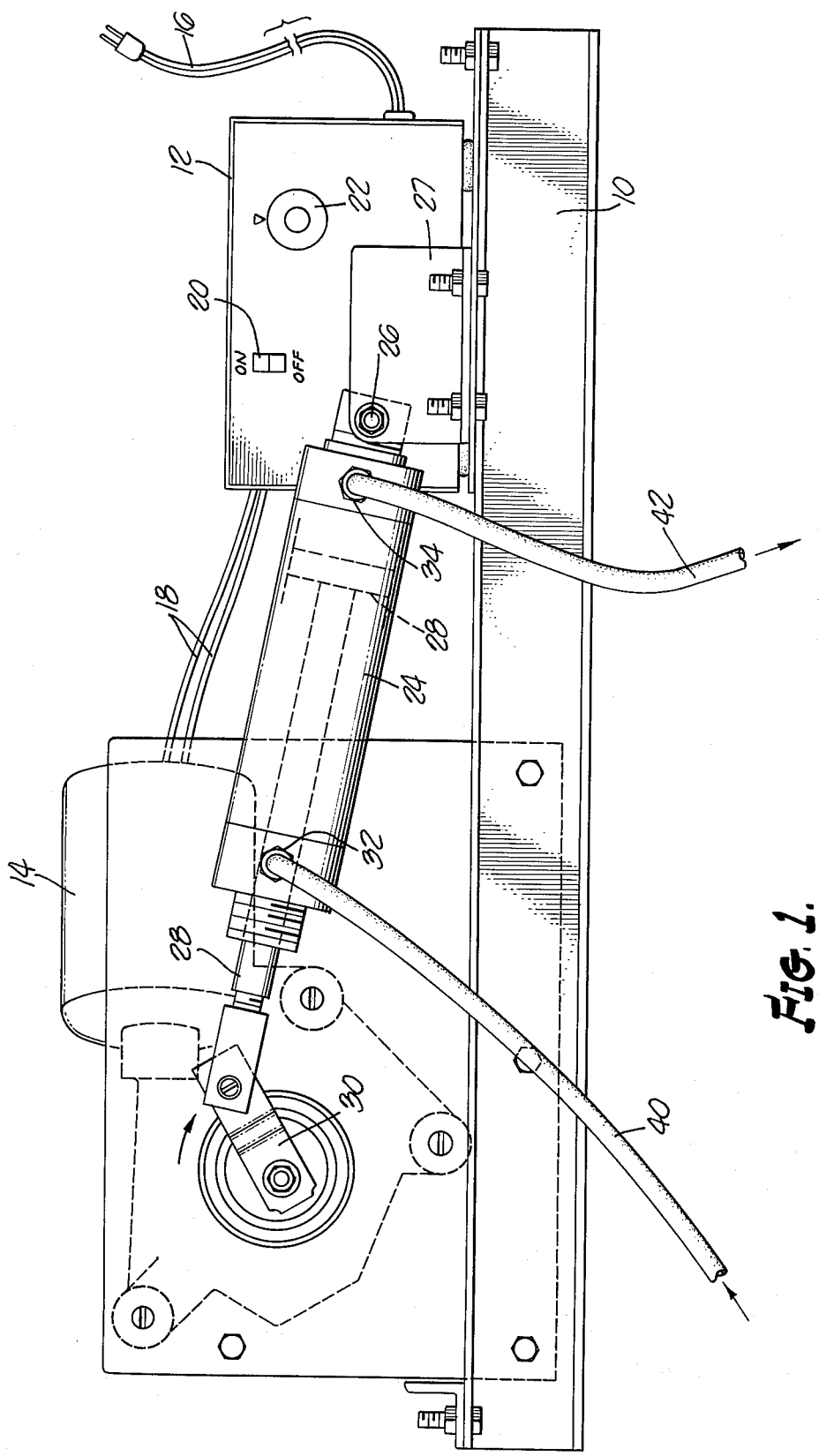
FIG. 1 is a side elevation showing a portion of the apparatus of the invention, in accordance with one embodiment.

The apparatus shown in FIG. 1 includes a frame 10. A step-down transformer and rectifier unit 12 is mounted on the frame 10, as is a direct current electric motor 14. The transformer and rectifier unit 12 is energized through an electric cord 16 which may be plugged into the usual domestic electrical outlet. The unit is connected to the motor 14 through appropriate electric leads 18. A switch 20 is provided for turning the unit on and off, and a speed control 22 is also provided for controlling the speed of the motor 14.

The electrical connections of the units described above are believed to be sufficiently well known so that a detailed description of the connections is deemed to be unnecessary. The illustrated embodiment uses a direct current electric motor, and the unit 12 to adapt the motor to be energized from the usual alternating current domestic power source. It is clear, however, that the electric motor could be energized from batteries in an automobile, or other appropriate power source. A direct current motor is used in the constructed embodiments of the invention, since they are susceptible to simple and inexpensive speed controls. However, it is clear that alternating current motors could be used, if so desired.

A usual hydraulic actuator cylinder 24 is mounted on the frame 10 by a pivotal coupling 26 between one end of the actuator and a bracket 27 on the frame. A piston 28 (FIG. 2) of the actuator is coupled to the electric motor 14 through an appropriate crank linkage 30. Then, when the motor is energized, the piston 28 is caused to move reciprocally within the cylinder of the actuator.

As the piston 28 is so moved reciprocally in the cylinder, air is cyclically drawn into and moved out of the usual ports 32 and 34. In the illustrated embodiment, the port 32 is coupled to a fitting A (FIG. 2) through a flexible elongated tube 40, and the port 34 is coupled to a fitting B (FIG. 2) through a flexible elongated tube 42.

The fitting A includes a manifold 50 which is coupled to the tube 40. The manifold 50 is also connected to a further flexible tube 52 which, in turn, is coupled to a massaging sleeve, of appropriate resilient material. Then, as the piston 28 is reciprocally moved in the cylinder 24, a volume of air is moved into and out of the sleeve.

A first air line 54 is also connected to the manifold 50, and a check valve 56 is included in the line 54. The check valve 56 may take the form of a flapper valve, and it serves to exhaust the air driven into the tubular member 40 to the atmosphere. A manually adjustable needle valve 58 is also included in the line 54, and it is adjusted to establish the amount of air which is passed through the air line 54 to the atmosphere for each stroke of the piston 28 of cylinder 24. This adjustment controls the volume of air fed to the sleeve through the tubular member 52 for each positive stroke of the piston 28.

A second air line 60 is also coupled to the manifold 50, and a spring loaded valve 62 is mounted on the line 60. The spring loaded valve 62 opens when the suction pressure exceeds a particular threshold during the negative stroke of the piston 28. The spring loaded valve 62 acts as a relief valve, to assure that the suction pressure established in the sleeve does not exceed a predetermined maximum.

Figure 2:
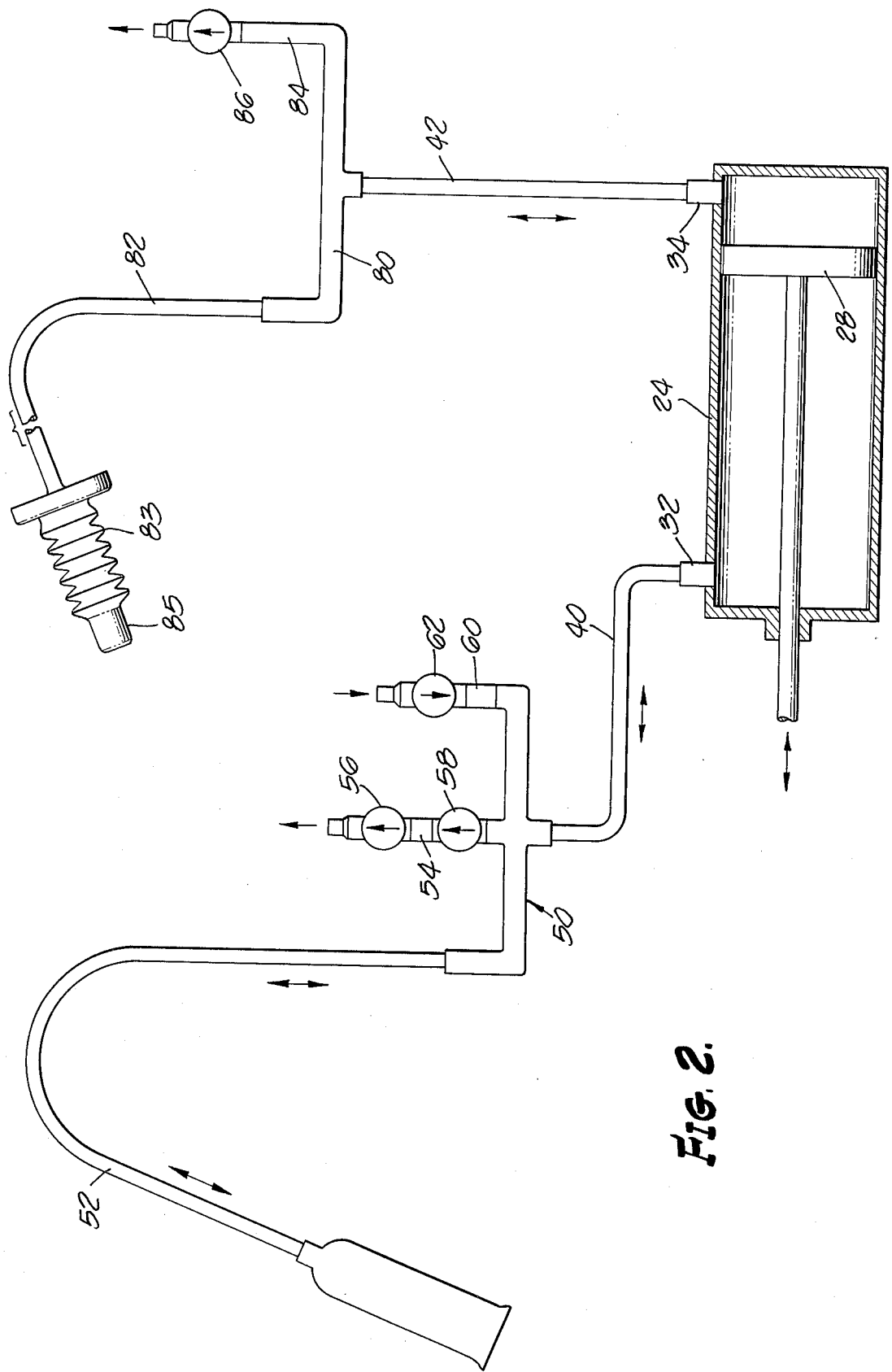
FIG. 2 is a schematic representation of various fittings which may be attached to the apparatus of FIG. 1 for male and female use.

The manual adjustment of the valve 58 controls the volume of air supplied to the sleeve for each positive stroke of piston 28, and its adjustment is independent of the setting of the spring loaded relief valve 62. Therefore, the spring loaded relief valve 62 may be set to any desired threshold without affecting the adjustment of the valve 58, and the valve 58 can be adjusted to any desired setting without affecting the setting of the valve 62. In each instance, the valve 62 establishes the level of suction pressure established in the sleeve, and the setting of the valve 58 establishes the volume of air supplied to the sleeve, for each cycle of the piston 28. The speed of the stroke of the piston 28 is controlled by the speed control 22.

tubular fitting B includes a manifold 80, as shown in FIG. 2, and the manifold is coupled to the tubulaar member 42, and to a bellows 83 through a further tube 82. An air line 84 is coupled to the manifold 80, and a manually adjustable needle valve 86 is mounted in the air line 84 to control the volume of air supplied to the bellows during each cycle, so as to control the stroke of the plunger portion of the member. A plunger 85, which may be of solid rubber, is mounted on the end of the bellows to be driven reciprocally by the bellows as the piston 28 moves back and forth in cylinder 24.

The invention provides, therefore, an improved apparatus which has universal application inducing orgasms in males and females, and which incorporates simple and appropriate controls for controlling the sensual action created by the apparatus.

It will be appreciated that although particular embodiments of the invention have been shown and described, modifications may be made. It is intended in the claims to cover the embodiments which come within the true spirit and scope of the invention.

What is claimed is:

1. Apparatus including: a frame; a cylinder mounted on the frame having at least one port therein; a piston reciprocally mounted in said cylinder for driving air out of and for drawing air in through the port as the piston is moved reciprocally in the cylinder; an electric motor mounted on said frame; crank linkage means mechanically coupling said electric motor to said piston for causing reciprocal movement of the piston in the cylinder when the motor is energized, a male genital engaging massaging sleeve; a manifold; a first tube coupling the manifold to the sleeve; a second tube coupling the manifold to the port in said cylinder; a first air line coupling the manifold to the atmosphere; a check valve mounted in the first air line to exhaust air through the first air line to the atmosphere for each positive stroke of the piston and to close and seal the first air line for each negative stroke of the piston; a manually adjustable valve mounted in the first air line to control the volume of air exhausted to the atmosphere for each positive stroke of the piston and thereby to control the volume of air fed to the sleeve for each positive stroke of the piston; a second air line coupling the manifold to the atmosphere; and a check valve mounted in the second air line to open the second air line to the atmosphere when the suction pressure of the air drawn into the second air line for each negative stroke of the piston exceeds a particular threshold, so as to provide a limit to the suction pressure passing through the second tube to the sleeve for each negative stroke of the piston.

2. The apparatus defined in claim 1, and which includes a second manifold; a third tube coupling the second manifold to the cylinder; a female genital engaging plunger; an elongated bellows attached to the plunger; a fourth tube coupling the bellows to the second manifold to cause the bellows to produce reciprocal movement of the plunger as the piston is moved reciprocally in the cylinder; a further air line coupling the second manifold to the atmosphere; and a manually adjustable valve mounted in the further air line to control the amount of air passing through the further air line during reciprocal movement of the piston thereby to control the stroke of the plunger.

3. The apparatus defined in claim 1, and which includes a manually adjustable speed control coupled to the electric motor for controlling the reciprocal speed of the piston in the cylinder.

* * * * *